United States Patent [19]

Studli

[11] 3,732,049
[45] May 8, 1973

[54] APPARATUS FOR THE MANUFACTURE OF GRANULATED MATERIAL

[76] Inventor: Hans Studli, Winterthur-Hard, Switzerland

[22] Filed: Apr. 12, 1971

[21] Appl. No.: 132,988

[30] Foreign Application Priority Data

Apr. 22, 1970  Switzerland ..................6036/70

[52] U.S. Cl. ..................425/192, 425/196, 425/311, 264/142
[51] Int. Cl. .................................................B29f 3/14
[58] Field of Search.................425/190, 192, 196, 425/310, 311; 264/141, 142, 143

[56] References Cited

UNITED STATES PATENTS

| | | |
|---|---|---|
| 2,476,272 | 7/1949 | Bauman..............................425/192 X |
| 2,149,920 | 3/1939 | Kretchmer..........................425/311 X |
| 1,205,710 | 11/1916 | Cavagnaro ..........................425/311 |
| 3,389,204 | 6/1968 | Hafliger..............................264/142 |
| 3,025,564 | 3/1962 | Voigt..................................264/142 |
| 3,388,431 | 6/1968 | Aoki..................................425/190 X |

Primary Examiner—Robert L. Spicer, Jr.
Attorney—Littlepage, Quaintance, Wray & Aisenberg

[57] ABSTRACT

An apparatus for manufacturing granulated material wherein a press or compression cylinder for a plastic molding material possesses a discharge end which can be closed by a counter piston. Between the peripheral edge of the compression cylinder and the peripheral edge of the counter piston there is provided a substantially ring-shaped throughpassage. Groove means are formed at least at one of the peripheral edges and through which groove means the molding material or mass can be pressed in the form of rods or strands. A rotating cutting element is mounted at the counter piston for the purpose of cutting these strands or rods.

6 Claims, 3 Drawing Figures

HANS STÜDLI INVENTOR.

APPARATUS FOR THE MANUFACTURE OF GRANULATED MATERIAL

BACKGROUND OF THE INVENTION

The present invention is directed to a new and improved apparatus for the manufacture of granular or granulated material.

The heretofore known state-of-the-art apparatuses for the fabrication of granulated materials typically relied upon the technique of pressing a plastic molding mass through a perforated disc or plate, the strands or rods departing from the perforated disc then being cut-up into granular material by a suitable cutting device. This manufacturing technique has not proven to be completely satisfactory because oftentimes clogging of the perforated disc occurs, resulting in considerable interruptions in the manufacturing operation. Furthermore, cleaning of the clogged perforated discs is not only cumbersome but also quite complicated and requires a great deal of effort.

SUMMARY OF THE INVENTION

Therefore, there is still present a real need in the art for equipment capable of manufacturing granular material without the aforementioned problems arising which are present in the heretofore discussed prior art apparatus. Hence, a primary object of this invention is to provide granular material- manufacturing equipment which is not associated with the aforementioned drawbacks of the prior art constructions and effectively and reliably fulfills the existing need in the art.

Another and more specific object of the present invention relates to a new and improved apparatus for manufacturing granular material in a highly efficient and economical fashion, minimizing the possible downtime of the equipment due to clogging. Still a further object of this invention relates to novel type of apparatus for manufacturing granular material without resorting to the use of the prior art employed perforated plates which had great tendency to clog and required expensive and difficult cleaning operations, and wherein specifically there is provided novel type coaction between the press cylinder and a counter piston and a unique construction of these components, minimizing possible clogging problems and facilitating cleaning of the equipment in an efficient and facile manner.

Now, in order to implement these and still further objects of the invention, which will become more readily apparent as the description proceeds, the inventive apparatus for the manufacture of granular or granulated materials comprises a compression or press cylinder for a plastic molding mass, this compression cylinder having a discharge end for the molding mass which can be sealed by a counter piston. A substantially ring-shaped throughpassage is provided between the peripheral edge or margin of the compression cylinder and the peripheral edge or margin of the counter piston. Groove means are formed at one of these peripheral edges, through which the molding mass can depart in the form of strands or rods. A rotating cutting element for cutting such rods or strands is mounted at the counter piston. In the event the groove means of this equipment become clogged they can be easily and quickly cleaned so that the equipment is again ready for operation after a relatively brief downtime.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
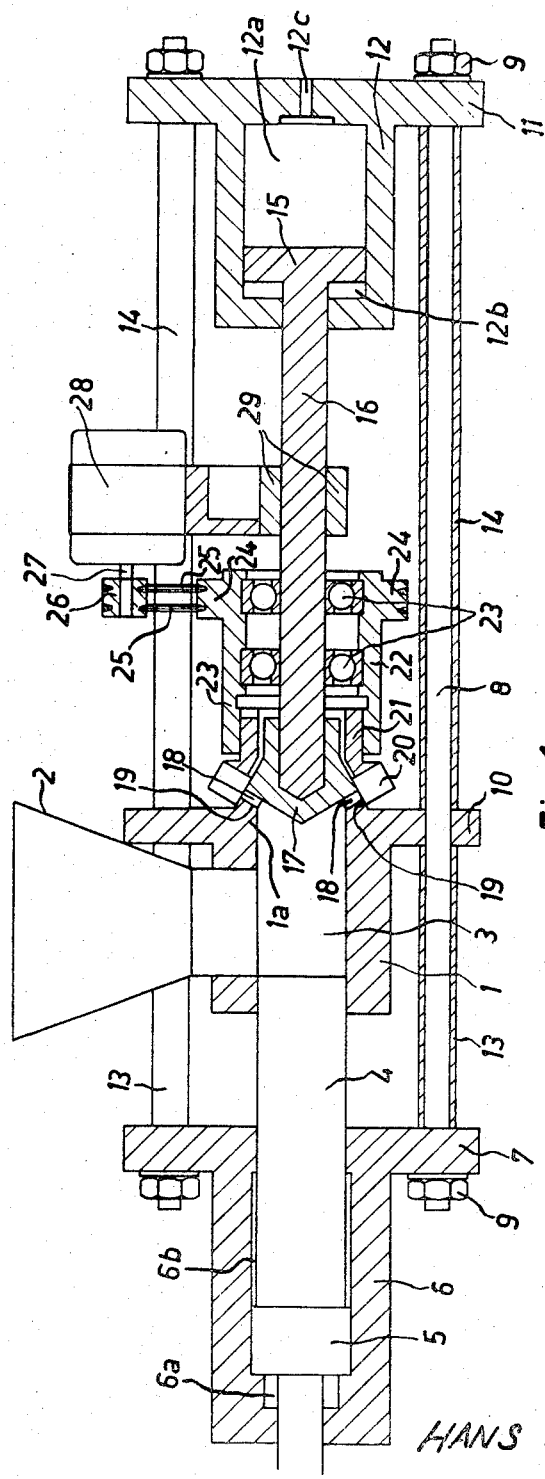
FIG. 1 is an axial longitudinal sectional view through a preferred embodiment of inventive apparatus for the manufacture of granular or granulated material.

Describing now the drawings, there is illustrated therein a preferred exemplary embodiment of inventive apparatus for the manufacture of granular or granulated material, and such apparatus will be seen to embody a compression of press cylinder 1 upon which there is mounted a supply means, here shown in the form of a funnel 2 through which it is possible to fill a plastic molding mass or material into the cylinder press compartment 3. Within cylinder 1 there is displaceably arranged a press piston or ram 4 which is operatively coupled with an actuation piston 5. Actuation piston 5 is reciprocable within an actuation cylinder 6 and can be selectively impinged at both faces with any suitable pressurized fluid medium, as is well known in the art, in order to bring about a work stroke and a withdrawal stroke for the press piston 4. Thus, when the pressurized fluid medium is admitted to the compartment 6a of the actuation cylinder 6 the press piston 4 is urged towards the right of FIG. 1 into its work stroke and if such pressurized fluid medium is admitted to the other compartment or chamber 6b of the actuation cylinder 6 the press piston 4 moves through its retraction or withdrawal stroke. Thus, it will be recognized that the actuation piston 5 constitutes one convenient construction of drive mechanism for reciprocating the press piston 4 in the manner described above.

Now a flange 7 of the actuation cylinder 6 is connected through the agency of four tie rods 8 and nut members 9 with the flange 10 of the press or compression cylinder 1 and with the flange 11 of a further actuation cylinder 12. The tubular members or spacers 13, 14 which bear against the flanges 7, 10 and 11, as shown, serve to ensure for the requisite mutual spacing of the cylinders 1, 6 and 12 from one another. Just as there was provided a piston member 5 within the actuation cylinder 6 and which could be selectively impinged at both faces with a suitable pressurized fluid medium, within the actuation cylinder 12 there is similarly reciprocably arranged a piston member 15 which likewise can be impinged at both faces with a suitable fluid medium. It will be obvious that when fluid medium is introduced into the chamber 12a the piston member 15 will be displaced towards the left of FIG. 1 and when such fluid medium is introduced into the other chamber 12b located at the opposite face of the piston member 15 the just mentioned piston member 15 will be displaced towards the right of FIG. 1. Piston member 15 is connected with a piston rod 16 which in turn carries a counter piston 17. Counter piston 17 is attached, for instance by threading, as indicated generally by reference character 15a (FIG. 2) with the left end of the piston rod 16. The end face of counter piston 17 possesses a substantially cone-shaped configuration and at its peripheral edge or margin is equipped with a substantially cone-shaped rim of grooves 18. This rim of grooves 18, as will be explained more fully hereinafter, cooperates with the substantially cone-shaped peripheral edge or margin 19 of the press cylinder 1.

Continuing, it will be observed that a respective cutting means, here shown as the knives 20, bear against the outside surface of the groove rim 18 at two diametrically opposed locations of such groove rim. These knives 20 are detachably secured to a support ring 21 threaded, as schematically indicated at reference character 21a in FIG. 2, with a bearing or support ring 22. This bearing ring 22 is rotatably mounted through the intermediary of two ball bearings 23 upon the piston rod 16, and furthermore bearing ring 22 is designed such that there is formed or carried thereat a belt pully 24 driven by pully belts 25 from a further belt pully 26 seated upon the driven output shaft 27 of any suitable drive motor, here shown as the electric motor 28. Electric motor 28 is attached through the agency of a support 29 to the piston rod 16.

Figure 2:
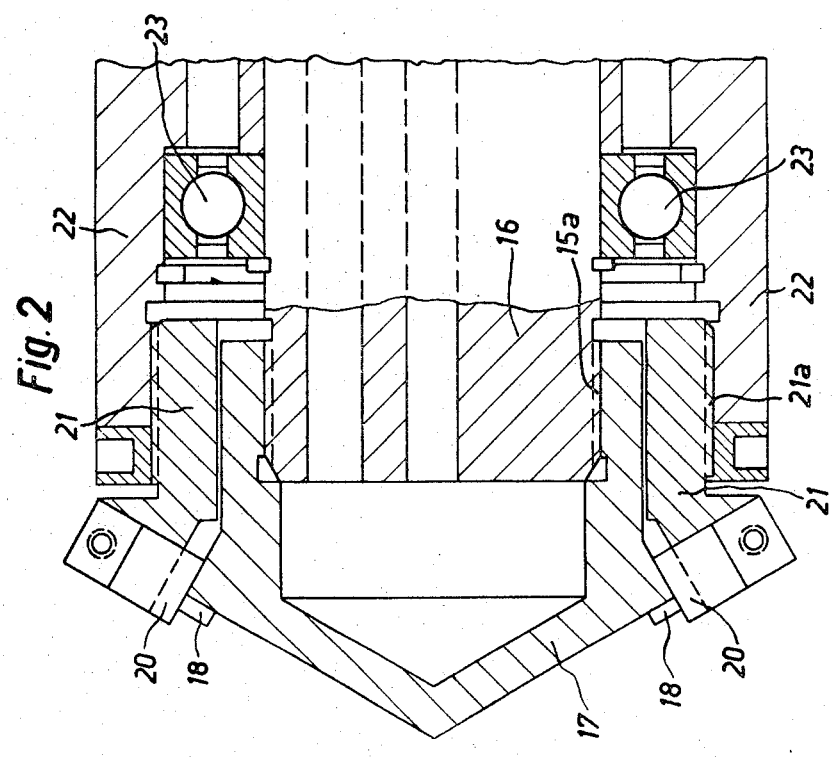
FIG. 2 is a fragmentary, enlarged sectional view, showing details of the counter piston used in the apparatus construction of FIG. 1.
Figure 3:
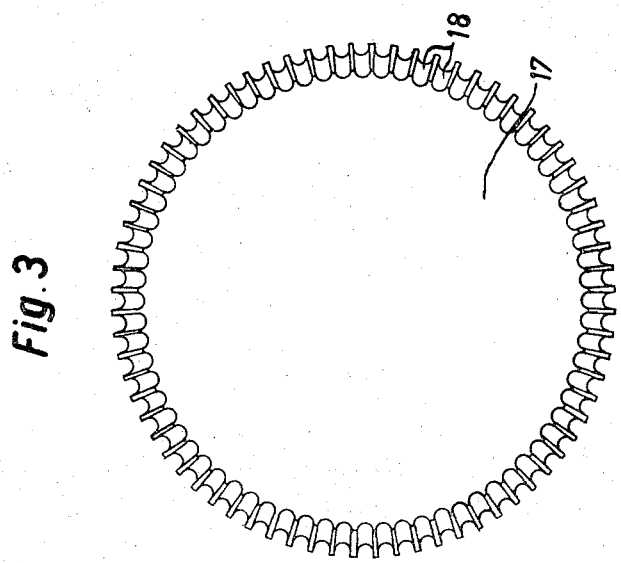
FIG. 3 is an end view of the counter piston depicted in FIG. 2.

Now the mode of operation of the heretofore described apparatus is as follows:

After filling the cylinder compartment 3 with the molding mass or material from the funnel 2 the left-hand face of piston member 5 of FIG. 1 is impinged with a pressurized fluid medium introduced in conventional fashion into the chamber 6a, resulting in the press piston or ram 4 being driven to the right and the molding material within the compartment 3 is compressed. The molding material is thus pressed between the peripheral margin or edge of the compression cylinder 1 and the peripheral edge or margin of the counter piston 17 defining a throughpassage and specifically through the groove means 18 thereof. Since as shown in FIG. 3 these groove means 18 are constituted by a plurality of open channels spaced adjacent one another about the periphery of the press piston 17 the plastic molding material is pressed out in the form of strands or rods which are then cut into granular material by the rotating cutting knives 20. A counter pressure is exerted upon the counter piston 17 by supplying a pressurized fluid medium to the right-hand face of the actuating piston 15, in other words by introducing pressurized fluid medium via, for instance, the opening 12c into the compartment 12a at the right face of piston 15, and owing to the larger cross-sectional area of the piston 15 than that of the piston 5 this counter pressure is always somewhat greater than the pressure of the compressed mass within the cylinder compartment 3. Consequently, the counter piston 17 is pressed snugly against the open discharge end 1a of the compression cylinder 1 by virtue of the pressure difference prevailing between the aforedescribed counter pressure and the pressure of the material within the cylinder compartment 3. Upon completion of the work stroke of the press piston 4 the pressurized fluid medium previously acting upon the left-hand face of the piston 5 of FIG. 1 and within the actuation chamber 6a is vented in any suitable fashion and at the same time the pressure acting upon the right-hand face of the piston 15 within the chamber 12a reduces such that only a slight counter pressure is still present, ensuring that the small support surfaces between the individual grooves 18 are never so strongly loaded that they can be destroyed. Now by introducing the pressurized fluid medium so as to enter the actuation chamber 6b and act upon the right-hand face of actuation piston 5 it is possible to retract the press piston 4. Upon completion of the return stroke of the press piston 4 a new supply of molding material is introduced into the cylinder compartment 3 and the aforedescribed operation repeats.

It is possible to displace the counter piston 17 towards the right of FIG. 1, in other words away from the compression cylinder 1, by introducing pressurized fluid medium into the compartment or chamber 12b so as to impinge against the left-hand face of piston 15. When this happens the groove rim is freely accessible and the individual grooves 18 can be easily cleaned.

By way of completeness it is here mentioned that instead of using a fluid operated drive piston 5 and the press ram 4 it would be possible to generate the pressure within the cylinder compartment 3 for compressing the plastic molding mass by also resorting to the use of a conventional worm press arrangement. Further, instead of forming or providing the grooves 18 at the counter piston 17, as shown, it would also be possible to reverse the arrangement in that such grooves could be provided at the peripheral margin or edge 19 of the compression cylinder 1, or further, it would even be possible to provide part of, such as half of the grooves at the periphery of the counter piston 17 and the remaining half of such grooves at the peripheral edge or periphery 19 of the compression cylinder 1. It will be apparent that the heretofore described operation would not be altered.

While there is shown and described present preferred embodiments of the invention, it is to be distinctly understood that the invention is not limited thereto but may be otherwise variously embodied and practiced within the scope of the following claims. Accordingly,

What is claimed is:

1. In an apparatus for manufacturing granular material, comprising:
 a press cylinder having a discharge end for plastic molding material, and
 a counter piston means for sealing off said discharge end of said press cylinder,
 the improvement comprising
 means for causing said press cylinder and counter piston means to cooperate with one another to form a substantially ring-shaped die having radially extended throughpassages for material located between a peripheral margin of said press cylinder and a peripheral margin of said counter piston means,
 groove means formed at least at one of said peripheral margins for having pressed therethrough the molding material in strand form, and
 rotatable cutting means mounted at said counter piston means for rotation around said ring-shaped throughpassage for cutting the strands of material.

2. The apparatus as defined in claim 1, further comprising:
   means for selectively displacing said counter piston means away from said press cylinder, whereby said groove means may be more easily cleaned.

3. The apparatus as defined in claim 2, further comprising:
   means for compressing the molding material within said press cylinder,
   said displacing means for said counter piston means functioning also to place the counter piston forceably against the press cylinder to exert a counter pressure which counteracts the pressure of the molding material within said press cylinder, said counter pressure being somewhat greater than the pressure of the molding material so that the counter piston means is pressed against said press cylinder due to the pressure difference prevailing between said counter pressure and the pressure of said molding material.

4. The apparatus as defined in claim 3, further including electric drive motor means for rotating said rotatable cutting means, and means for supporting said electric drive motor means upon said counter piston means.

5. The apparatus as defined in claim 1, wherein said groove means are formed as a rim at the periphery of said counter piston means.

6. The apparatus as defined in claim 5, wherein said groove rim possesses a substantially cone-shaped configuration.

* * * * *